(12) United States Patent
Gong

(10) Patent No.: US 11,053,921 B2
(45) Date of Patent: Jul. 6, 2021

(54) MULTI-SOURCE RENEWABLE POWER GENERATION SYSTEM

(71) Applicant: Laura Gong, Lomita, CA (US)

(72) Inventor: Laura Gong, Lomita, CA (US)

(*) Notice: Subject to any disclaimer, the term of this patent is extended or adjusted under 35 U.S.C. 154(b) by 0 days.

(21) Appl. No.: 15/901,125

(22) Filed: Feb. 21, 2018

(65) Prior Publication Data

US 2018/0180028 A1    Jun. 28, 2018

(51) Int. Cl.
| | |
|---|---|
| *F03D 9/00* | (2016.01) |
| *F03B 13/18* | (2006.01) |
| *F03D 13/25* | (2016.01) |
| *F03D 3/00* | (2006.01) |
| *H02S 10/12* | (2014.01) |
| *H02S 20/00* | (2014.01) |
| *H02S 10/10* | (2014.01) |

(52) U.S. Cl.
CPC .......... *F03D 9/008* (2013.01); *F03B 13/1845* (2013.01); *F03D 3/005* (2013.01); *F03D 9/007* (2013.01); *F03D 13/25* (2016.05); *H02S 10/10* (2014.12); *H02S 10/12* (2014.12); *H02S 20/00* (2013.01); *F05B 2220/707* (2013.01); *F05B 2220/708* (2013.01); *F05B 2240/214* (2013.01); *F05B 2240/93* (2013.01); *F05B 2250/231* (2013.01); *Y02E 10/30* (2013.01); *Y02E 10/727* (2013.01)

(58) Field of Classification Search
CPC .......... F03D 3/005; F03D 9/007; F03D 9/008; F03D 13/25; H02S 10/10; H02S 10/12; H02S 20/00; F03B 13/1845; Y02E 10/30; Y02E 10/50; Y02E 10/727; Y02E 10/74; F05B 2220/707; F05B 2220/708; F05B 2240/93; F05B 2240/214; F05B 2250/231

USPC .............................................. 290/42, 44, 55
See application file for complete search history.

(56) References Cited

U.S. PATENT DOCUMENTS

| | | | | |
|---|---|---|---|---|
| 3,546,473 A | * | 12/1970 | Rich ................... | H02K 7/1876 290/42 |
| 4,539,485 A | * | 9/1985 | Neuenschwander ........................ | F03B 13/187 290/53 |
| 4,553,037 A | * | 11/1985 | Veazey ................... | F03D 13/25 290/55 |
| 5,696,413 A | * | 12/1997 | Woodbridge ....... | F03B 13/1855 290/53 |
| 6,100,600 A | * | 8/2000 | Pflanz .................... | B01D 61/58 290/54 |

(Continued)

*Primary Examiner* — Pedro J Cuevas
(74) *Attorney, Agent, or Firm* — Barry Choobin; Patent 360

(57) ABSTRACT

A multi-source power generation system to generate electricity by utilizing a combination of renewable energy sources such as wind, solar and wave energy is disclosed. The power generating system comprises a frame including a float body and a cylindrical body integral to the float body is submerged below the surface of sea water. A solar power generator comprising solar panel is mounted above the float portion, which is configured to receive the solar power energy and produce electrical potential. A wave energy generator is disposed inside the cylindrical body to harness wave energy from wave motion. A wind turbine disposed on the float body, which is configured to harness wind energy from wind. The cylindrical body comprises a cylindrical compartment including a cylindrical magnet which is configured to move in and out of a coil to generate electrical energy.

4 Claims, 4 Drawing Sheets

(56) References Cited

U.S. PATENT DOCUMENTS

| | | | | |
|---|---|---|---|---|
| 7,100,438 B2* | 9/2006 | LeMieux | B63B 39/00 | 73/170.16 |
| 7,199,481 B2* | 4/2007 | Hirsch | F03B 13/1845 | 290/42 |
| 7,298,054 B2* | 11/2007 | Hirsch | F03B 13/1845 | 290/42 |
| 7,323,790 B2* | 1/2008 | Taylor | F03B 13/1895 | 290/42 |
| 7,385,301 B2* | 6/2008 | Hirsch | F03B 13/1845 | 290/42 |
| 7,453,164 B2* | 11/2008 | Borden | F03D 9/25 | 290/42 |
| 7,789,723 B2* | 9/2010 | Dane | B63B 35/00 | 114/312 |
| 8,446,030 B2* | 5/2013 | Brown | E02B 9/08 | 114/264 |
| 8,487,480 B1* | 7/2013 | Kesler | B60L 11/007 | 307/104 |
| 8,629,572 B1* | 1/2014 | Phillips | F03B 13/16 | 290/53 |
| 8,664,795 B2* | 3/2014 | Borden | F03D 9/32 | 290/55 |
| 8,946,919 B2* | 2/2015 | Phillips | F03B 13/16 | 290/53 |
| 8,946,920 B2* | 2/2015 | Phillips | F03B 13/16 | 290/53 |
| 8,952,560 B2* | 2/2015 | Phillips | F03B 13/16 | 290/53 |
| 8,963,358 B2* | 2/2015 | Phillips | F03B 13/16 | 290/53 |
| 9,163,607 B2* | 10/2015 | Tabe | F03B 13/262 | |
| 9,476,400 B2* | 10/2016 | Phillips | F03B 13/16 | |
| 9,624,900 B2* | 4/2017 | Phillips | F03B 13/20 | |
| 9,644,601 B2* | 5/2017 | Phillips | F03B 13/16 | |
| 10,011,910 B2* | 7/2018 | Phillips | C25B 15/08 | |
| 2006/0005617 A1* | 1/2006 | LeMieux | B63B 39/00 | 73/170.01 |
| 2006/0208839 A1* | 9/2006 | Taylor | F03B 13/1895 | 335/205 |
| 2010/0237623 A1* | 9/2010 | Brown | E02B 9/08 | 290/53 |
| 2010/0244450 A1* | 9/2010 | Tabe | F03B 13/262 | 290/53 |
| 2012/0139351 A1* | 6/2012 | Wang | H02J 3/386 | 307/82 |
| 2012/0150679 A1* | 6/2012 | Lazaris | G06Q 30/0605 | 705/26.2 |
| 2013/0213289 A1* | 8/2013 | Borden | F03D 9/25 | 114/144 B |
| 2014/0117673 A1* | 5/2014 | Phillips | F03B 13/16 | 290/53 |
| 2014/0117674 A1* | 5/2014 | Phillips | F03B 13/16 | 290/53 |
| 2014/0313001 A1* | 10/2014 | Phillips | F03B 13/16 | 335/306 |
| 2014/0339928 A1* | 11/2014 | Phillips | F03B 13/16 | 310/30 |
| 2015/0054286 A1* | 2/2015 | Al-Garni | H02S 10/00 | 290/55 |
| 2015/0145258 A1* | 5/2015 | Phillips | F03B 13/16 | 290/53 |
| 2015/0167636 A1* | 6/2015 | Al-Garni | F03D 3/005 | 307/72 |
| 2016/0010619 A1* | 1/2016 | Phillips | F03B 13/16 | 290/53 |
| 2016/0141911 A1* | 5/2016 | Al-Garni | H02J 7/35 | 307/48 |
| 2016/0252071 A1* | 9/2016 | Phillips | F03B 13/20 | 290/50 |
| 2017/0110883 A1* | 4/2017 | Tabe | F03B 13/00 | |
| 2017/0194837 A1* | 7/2017 | Sichau | H02S 30/20 | |
| 2017/0198401 A1* | 7/2017 | Phillips | H02K 7/1853 | |
| 2018/0212432 A1* | 7/2018 | Byrnes | F03D 9/007 | |

* cited by examiner

MULTI-SOURCE RENEWABLE POWER GENERATION SYSTEM

BACKGROUND OF THE INVENTION

A. Technical Field

The present invention generally relates to power generation utilizing renewable energy sources, and more specifically relates to a power generation system to generate electricity by utilizing a combination of renewable energy sources such as wind energy, solar energy and wave energy.

B. Description of Related Art

Energy production has been a worldwide concern. Power plants such as fossil-fuel power plants emit air pollutants, discharge potentially harmful effluents into surface and ground water, and generate considerable amounts of solid wastes, some of which may be hazardous. Hence, the environmental impacts of electricity generation contribute to large-scale regional environmental concerns as well as localized concerns that affect the area directly surrounding the power plant. Renewable energy technologies such as energy generation plants operated by a renewable energy source are clean sources of energy that have a much lower environmental impact than conventional energy technologies. These renewable energy generation plants include biogas plants, geothermal plants, photovoltaic plants or solar collectors, water power plants and wind energy plants.

Renewable energy generation plants convert the energy provided by the renewable energy sources into electrical energy or thermal energy, which could be easily availed for further use. Due to convenience, cost and ecofriendly nature, renewable energy has become a preferred energy source. Each of the above-mentioned power plants are operated as separate power generating systems and has its own drawbacks. Photovoltaics or solar power plants are dependent on sunlight to effectively gather solar energy and energy collection is not possible during the night. Although solar energy could be collected during clouds days, the efficiency still drops. Further, prolonged period of cloudy and rainy day has a noticeable effect on the efficiency of the energy system.

Wave energy sources or tidal power plant requires a consistent flow of powerful waves to generate significant amount of wave power. Some areas experience unreliable wave behavior and it becomes unpredictable to forecast accurate wave power and therefore cannot be trusted as reliable energy source. Wind energy source is a fluctuating source of energy and is not suited to meet the base load energy demand unless some form of energy storage is utilized such as e.g. batteries. From the foregoing discussion, the ability to control and predict energy generation form renewable energy source represent a considerable challenge.

Hence, there is a need of a renewable energy system that fulfils the energy requirements. Therefore, the present invention utilizes a combination of renewable energy sources to provide a reasonably steady and continuous source of electricity.

SUMMARY OF THE INVENTION

The present invention discloses a multi-source power generation system to generate electricity by utilizing a combination of renewable energy sources such as wind energy, solar energy and wave energy. The present invention integrates solar power generator, wind turbine and wave energy generator to provide a reasonably steady and continuous source of electricity.

The renewable power generating system comprises a frame including a float body and a cylindrical body integral to the float body. The float body is disposed above a surface of a body of liquid and the cylindrical body is submerged at a depth below the surface of the body of liquid. The cylindrical body comprises a cylindrical compartment running through the length of the cylindrical body. The cylindrical compartment comprises a cylindrical magnet and a coil comprising magnet wire.

The solar power generator comprising solar panel is mounted above the float portion, which is configured to receive the solar power energy and produce electrical potential. A wave energy generator is disposed inside the cylindrical body of the frame to harness energy from wave motion on the surface of the body of liquid. The wave energy generator comprises a point absorber to capture the up and down motions of the wave. A wind turbine disposed on the float body, which is configured to receive wind from any direction to harness wind energy. In an embodiment, the wind turbine is a vertical axis wind turbine, which comprises a plurality of wind turbine blades. The turbine blades are in mechanical communication with a rotor. The turbines are configured to translate the force to the rotor, and wherein the turbine blade is responsive to the wind power. The wave energy generator and the wind turbine are configured to convert the wave energy and wind energy to mechanical energy, respectively.

The cylindrical magnet is configured to move in and out of the coil due to the mechanical energy. The movement of magnet in to the coil changes the flux and induces the flow of alternating current on the coil according to faradays law of electromagnetic induction. In another embodiment, the present invention further comprises a diode bridge rectifier to convert the alternating current to direct current. In an embodiment, the magnet is attached to a spring weight through rope for up and down movement of the cylindrical magnet. In another embodiment, the present invention further comprises electronic measuring equipment to monitor the power generated from the multi-source power generation system.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 1:
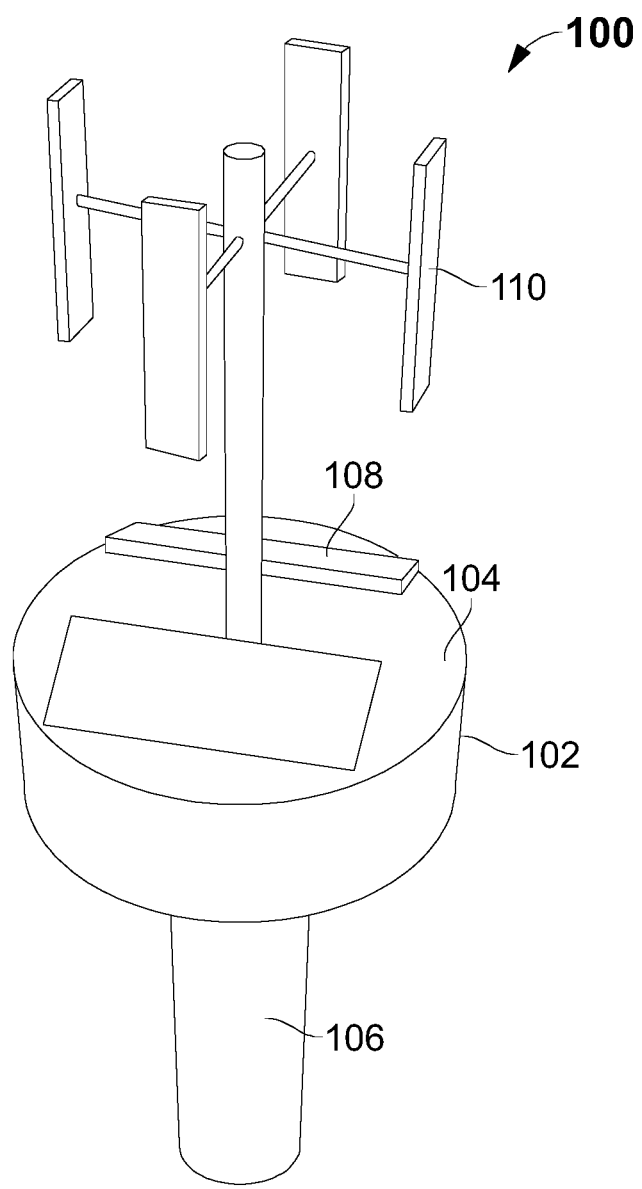
FIG. 1 exemplarily illustrates a perspective view of a multi-source renewable power generation system in accordance with various embodiments of the present invention.

Referring to FIG. 1, the present invention relates to a multi-source renewable power generating system 100 which utilizes at least three sources of ambient energy. The power generating system 100 comprises a solar power generator 108, a wind turbine 110 and a wave energy generator. The renewable power generating system 100 comprises a frame 102 including a float body 104 and a cylindrical body 106 integral to the float body 104. The float body 104 is disposed above a surface of a body of liquid and the cylindrical body 106 is submerged at a depth below that is a significant fraction of the length of the prevailing wavelengths of wave or swell in the body of liquid. In an embodiment, the cylindrical body 106 comprises a cylindrical compartment 116 running through the length of the cylindrical body 106. In an embodiment, the body of liquid is sea water.

The solar power generator 108 comprising solar panel is mounted above the float body 104 is configured to receive the solar power energy and produce electrical energy. In an embodiment, the number, type and arrangement of solar panels is dependent upon the particular needs and desires of the user. A wave energy generator is disposed inside the cylindrical body 106 of the frame 102 is configured to harness energy from wave motion on the surface of the body of liquid. In an embodiment, the wave energy generator comprises point absorber. The point absorber is configured to capture the up and down motions or wave motion of the wave. In an embodiment, a wind turbine 110 disposed on the float body 104 is configured to harness wind energy from wind. In an embodiment, the wind turbine 110 is vertical axis wind turbine, which is configured to receive wind from any direction. In an embodiment, the vertical wind turbine comprises a plurality of wind turbine blades. The turbine blades are in mechanical communication with the rotor. The turbines are configured to translate the force to the rotor, and wherein the turbine blade is responsive to the wind power.

Figure 2:
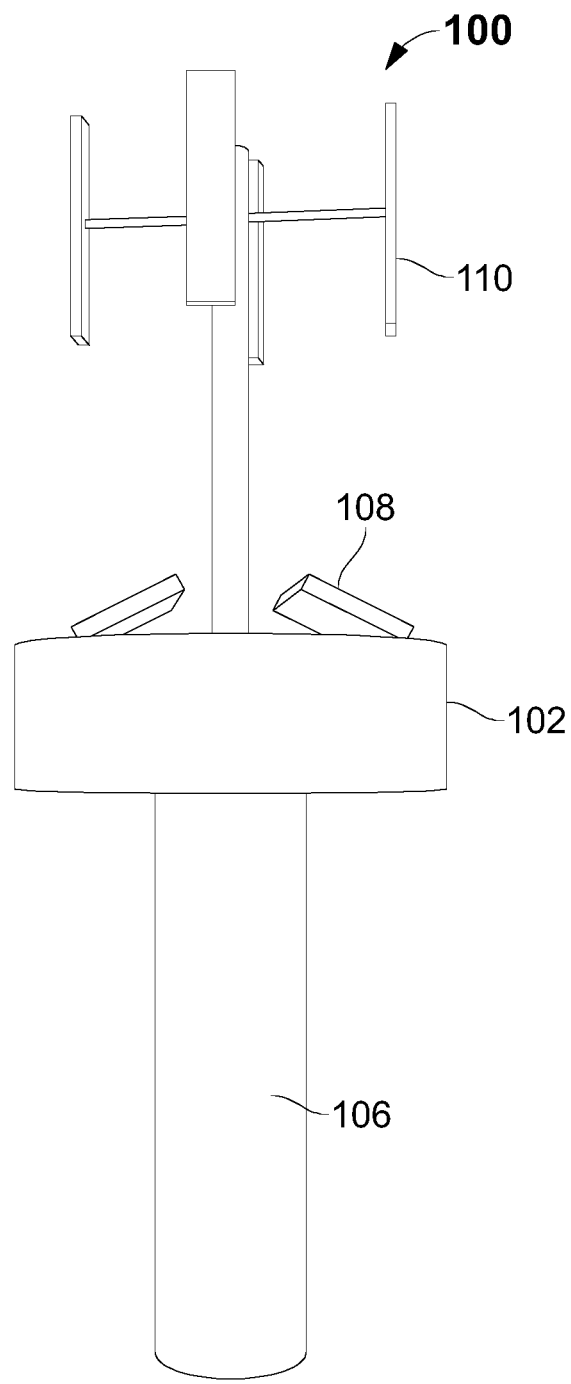
FIG. 2 exemplarily illustrates a side view of the multi-source renewable power generation system in an embodiment of the present invention.
Figure 3:
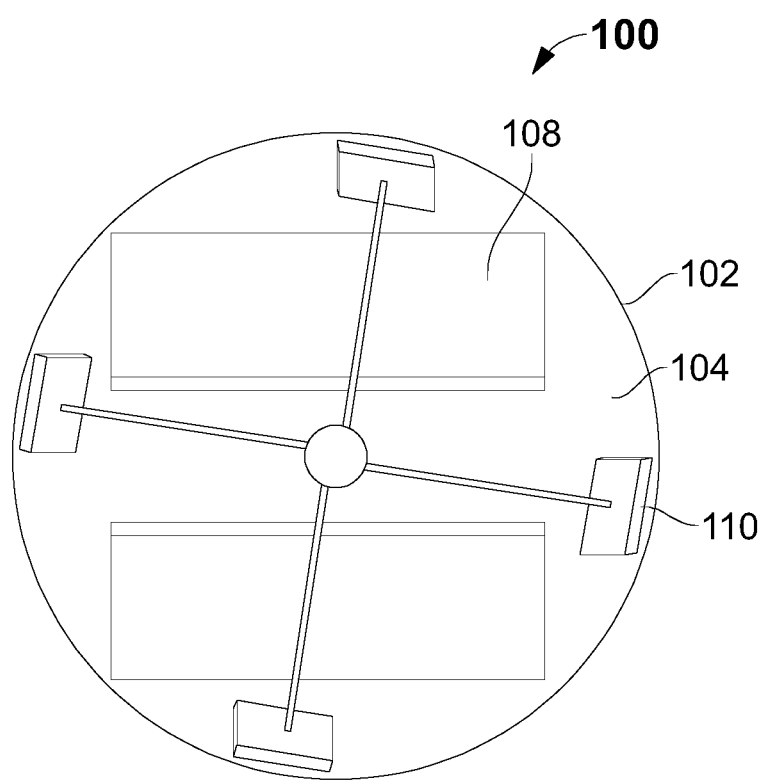
FIG. 3 exemplarily illustrates a top view of multi-source renewable power generation system in an embodiment of the present invention.

The wave energy generator and the wind turbine 110 are configured to convert the wave energy and wind energy to mechanical energy, respectively. Referring to FIG. 2 a side view of the multi-source renewable power generation system 100 is disclosed in an embodiment of the present invention. Referring to FIG. 3 a top view of multi-source renewable power generation system 100 is disclosed in an embodiment of the present invention.

Figure 4:
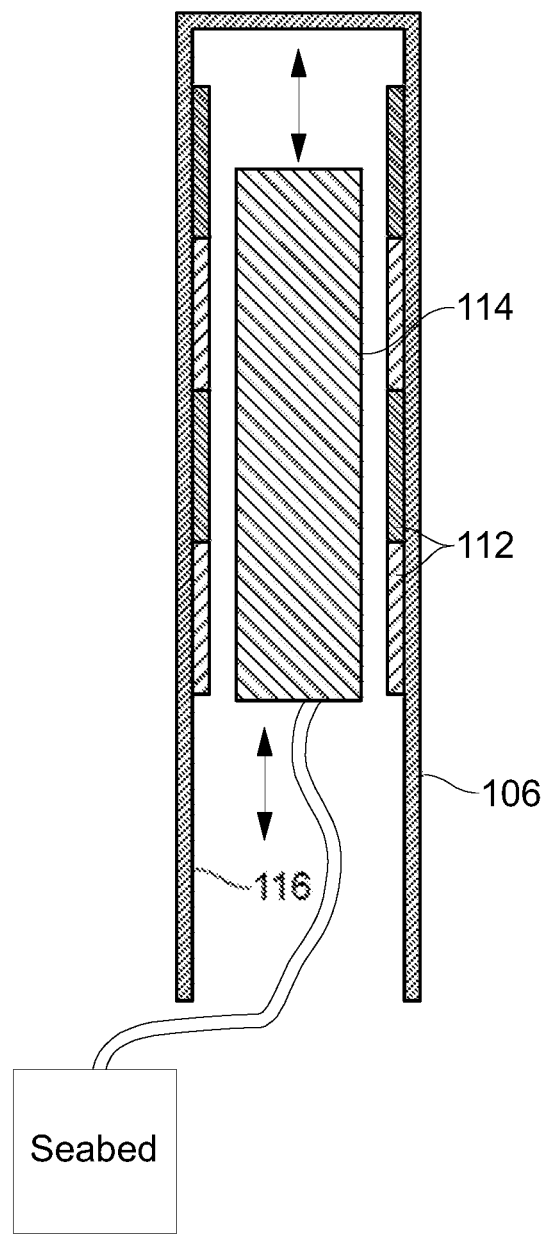
FIG. 4 exemplarily illustrates a cross sectional view of the cylindrical compartment of the multi-source renewable power generation system in an embodiment of the present invention.

Referring to FIG. 4, a cross sectional view of a cylindrical body 106 comprising a cylindrical compartment 116 of the multi-source renewable power generation system 100 is disclosed in an embodiment of the present invention. In one embodiment, the cylindrical compartment 116 comprises a cylindrical magnet 114 and a coil 112 wounded with magnet wire. The cylindrical magnet 114 comprises north pole at one end and south pole at another end. In another embodiment, the cylindrical compartment 116 comprises sliders. The cylindrical magnet 114 is configured to move in and out of the coil due to the mechanical energy. The movement of magnet 114 into the coil 112 changes the flux and induces the flow of current on the coil according to faradays law of electromagnetic induction. The movement of magnet 114 into the coil creates alternating current. In another embodiment, the present invention further comprises a diode bridge rectifier to convert the alternating current to direct current. In an embodiment, the magnet 114 is attached to a spring weight through rope for up and down movement of the cylindrical magnet 114. In one embodiment, the cylindrical magnet 114 is a permanent magnet. In another embodiment, the present invention further comprises electronic measuring equipment to monitor the power generated from the multi-source power generation system 100.

Advantageously, the present enables to utilize at least three sources of ambient energy. According to the present invention, a combination of renewable energy sources provides a reasonably steady and continuous source of electricity to the consumers and fulfills the energy requirement of the consumer.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A multi-source renewable power generating system, comprising:
a frame comprising a float body configured to be disposed above a surface of a body of liquid and a cylindrical body that extends below from the float body and configured to submerged in the body of liquid, wherein the cylindrical body comprises a cylindrical hollow housing, the cylindrical hollow housing integral with the float body, the cylindrical hollow housing having a cylindrical wall, the cylindrical wall having an inner surface, a coil wound around the inner surface of the cylindrical wall, the cylindrical hollow housing slidably enclosing a cylindrical magnet, said cylindrical magnet is configured to move up and down relative to the coil in response to the received mechanical energy to generate alternating current, the cylindrical magnet is attached to a spring weight through a rope for the up and down movement of the cylindrical magnet;

a solar power generator comprising a plurality of solar panel disposed above the float body is configured to receive solar energy and produce electrical energy; and a wind turbine comprising a vertical shaft that extends upwards from the float body, the vertical shaft having a plurality of blades coupled to the shaft through a plurality of legs, the plurality of blades are parallel to each other.

2. The power generation system according to claim 1, wherein the shaft is coupled to a rotor, and wherein the plurality of blades are responsive to the wind.

3. The power generation system according to claim 1, wherein the body of liquid is a sea water.

4. The power generation system according to claim 1, wherein the cylindrical magnet is a permanent magnet.

\* \* \* \* \*